March 3, 1936. L. ROUSSY ET AL 2,032,955
SYSTEM OF ASSEMBLY FOR THE ELEMENTS OF CONSTRUCTIONAL TOYS
Filed Jan. 31, 1934 2 Sheets-Sheet 1
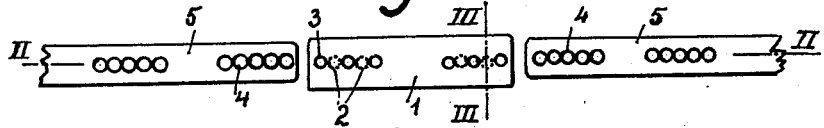
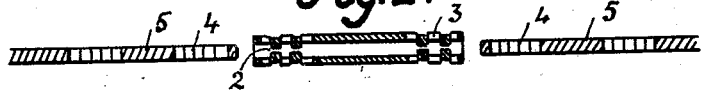
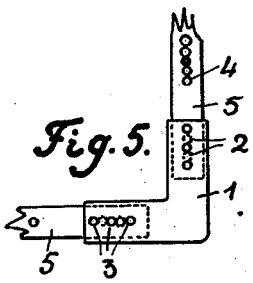
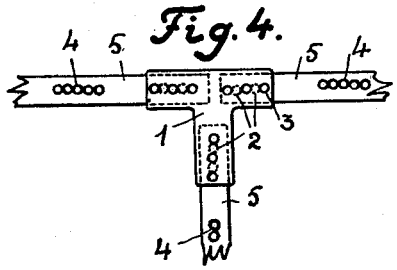
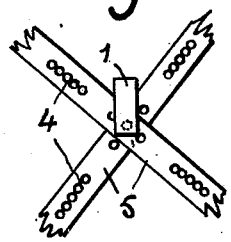
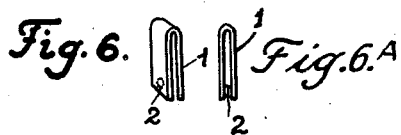
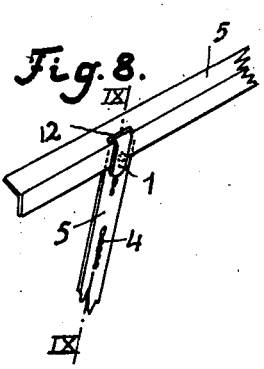
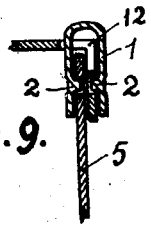
INVENTORS—
LOUIS ROUSSY
RENÉ TRUBERT
BY
ATTORNEY.

March 3, 1936. L. ROUSSY ET AL 2,032,955
SYSTEM OF ASSEMBLY FOR THE ELEMENTS OF CONSTRUCTIONAL TOYS
Filed Jan. 31, 1934 2 Sheets-Sheet 2
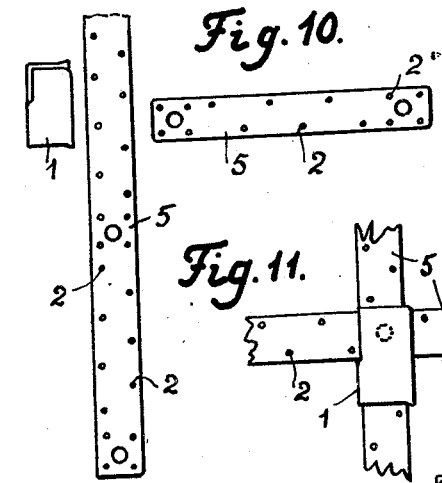
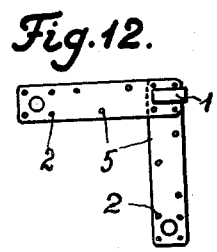
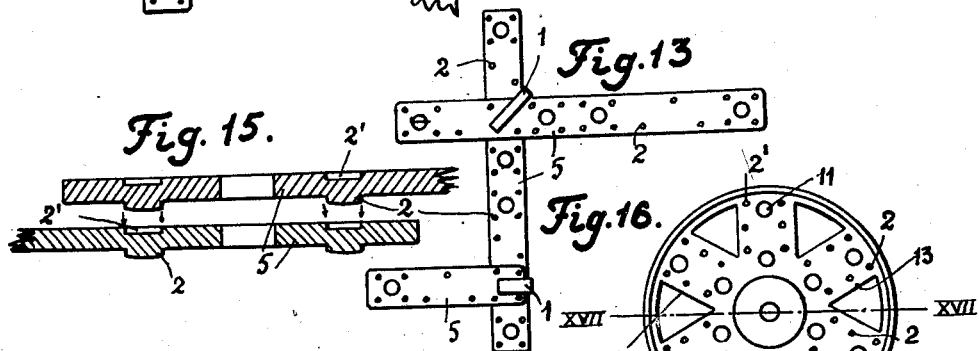
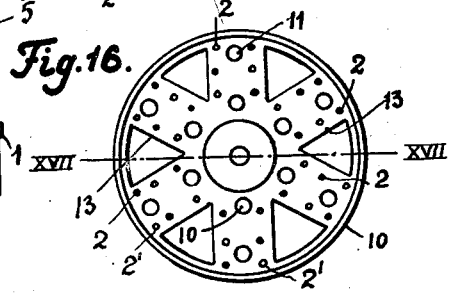
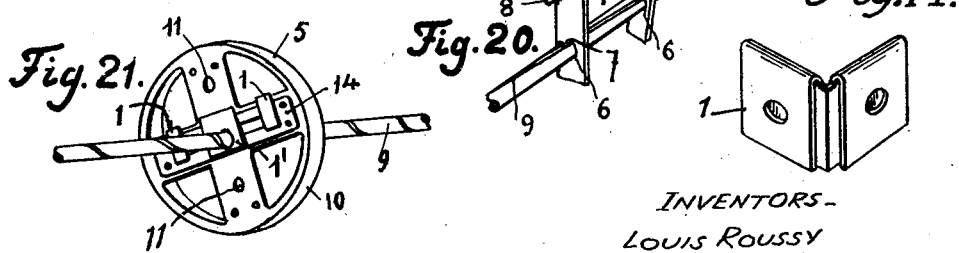
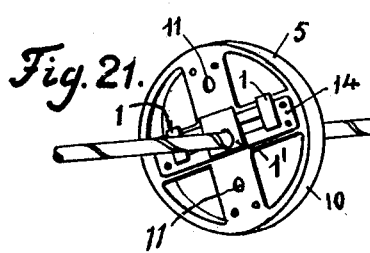
INVENTORS—
LOUIS ROUSSY
RENÉ TRUBERT
BY
ATTORNEY.

Patented Mar. 3, 1936

2,032,955

UNITED STATES PATENT OFFICE 2,032,955

SYSTEM OF ASSEMBLY FOR THE ELEMENTS OF CONSTRUCTIONAL TOYS

Louis Roussy, Paris, and René Trubert, Viroflay, France

Application January 31, 1934, Serial No. 709,054
In France February 3, 1933

2 Claims. (Cl. 46—29)

The present invention relates to metal constructional toys comprising a relatively small number of simple metal elements such as strips, angle bars, L-pieces, plates, discs and the like, these elements being pierced with holes for assembly by means of screws and nuts.

More particularly the invention relates to the method of assembling the said elements with the object of replacing the screws and nuts by simple clip fastenings. The latter can be smooth or may be provided with embossings or holes to which correspond similar devices formed on the pieces to be assembled. In the case of smooth fastenings it is only the pieces to be assembled which have embossings which form a projection in relief on one side of the metal strip and a corresponding depression on the other side, and which at the time of assembly engage the one in the other. The positioning and removal of these fastenings is extremely simple and rapid, and this is an advantage over the use of screws and nuts in simplifying the erection, as well as doing away with the inconvenience resulting from the loosening of bolts.

The said embossings are set out on the pieces to be assembled in such a manner that their location and arrangement allows for securing the pieces to be assembled in all usual positions employed in making up different articles, and they can be secured in such positions if desired by a very limited number of bolts, as angular displacement of parts is prevented by the plurality of embossings in engagement.

The fastening according to the invention comprises principally a simple metal band bent in such a way as to constitute a spring clip, which may be made in various forms. This piece may be smooth or preferably may be formed with small depressed or raised embossings, i. e. dents which form a corresponding projection on the other side of the metal. Alternatively, holes may be formed in the clips, or holes and embossing may alternate. The elements to be assembled carry the same arrangements inverted, so that to assemble them it is sufficient to force a fastening astride them.

The features of the invention will better appear from the following description taken in conjunction with the accompanying drawings which represent by way of example various forms of the assembly elements and the corresponding formation of the parts to be assembled, in accordance with the invention, and which are intended for the inter-assembly of various detached pieces.

On the drawings, Figure 1 shows in elevation two extremities of the elements to be assembled by the aid of one possible form of the fastening according to the invention, whilst Figure 2 is a section on II—II of Figure 1, and Figure 3 is a section on III—III of Figure 1.

Figure 4 shows in plan view a fastening with embossings and holes for assemblies in the form of a T, and Figure 5 a fastening in the form of a right angle.

Figure 6 shows in perspective a form of clip of smaller dimensions provided with embossings and adapted, for example, for the assemblies of cross pieces as shown in Figure 7, or angle bars as shown in Figure 8.

Figure 6A is an end view of Figure 6.

Figure 9 shows a section on IX—IX of the assembly in Figure 8.

Figure 10 shows two elements to be assembled and a smooth fastening of a special form.

Figure 11 shows a cross-form assembly by means of the smooth fastening of the preceding figure.

Figure 12 shows a method of assembly by means of fastenings of narrow form, and Figure 13 shows a more complicated erection by means of these fastenings.

Figure 14 shows a form of fastening for angle assemblies.

Figure 15 shows in section to a much larger scale the adjacent parts of two elements to explain the interengagement of the said embossings and the possibility of bolting in addition.

Figure 16 shows how the new assembly embossings can be applied to wheels, Figure 17 being a section on XVII—XVII of Figure 16 of a wheel of such form that two can be placed back to back to form a pulley.

Figure 18 shows an elevation of a fastening serving to fix a wheel on an axle and Figure 19 a side view of said fastening in position on an axle with a part section of a wheel.

Figure 20 is an explanatory diagram of the functioning of the fastening shown in Figures 18 and 19.

Figure 21 shows another method of fixing a wheel on an axle.

In essence, the invention consists in providing the pieces to be assembled with the aforesaid inter-engaging embossing and depressions, and providing a spring clip to be placed across the junctions so as to hold the pieces in fixed angular relationship; alternatively, where fixed angular relationship is not required or is otherwise secured, in providing the embossings on the clip and holes on the pieces to be assembled. On the figures the embossings have been indicated by the reference 2 and the corresponding depressions, i. e. the dents on the other side of the metal by which the embossings are produced, by the reference 2'.

The fastening 1 for adjacent elements 5 comprises in all cases a clip of springy material of U cross section, and the form of the clip may be elongated for joining abutting ends of strip elements as shown in Figures 1 and 2, of T or L form as shown respectively in Figures 4 and 5, or of narrow form as hereinafter described. At each end of the clip 1 and on each side or limb of the U, the metal is forced inwards to form the embossings 2 on the inside of the clip which are adapted to engage with the holes 4 in the elements to be assembled. In the example shown, these holes are arranged in groups of five very close together. Between and beside the embossings 2 in the clip 1 holes 3 are pierced for the reception of bolts which in certain cases could reinforce the connection between the elements to be assembled. To assemble, the elements 4 are simply pushed between the yielding sides of the clip 1, after which the embossings 2 spring into the holes 4.

It is to be understood that the holes and embossings can be arranged inversely, that is to say, the former in the fastening clip and the latter on the elements to be assembled. Likewise, the fastening 1, Figure 1, may be cut away at the bend at either or both ends, as shown at 1a in Figures 10 and 11, thus offering possibilities of more varied assemblies.

More or less narrow fastenings of the type shown in Figure 6 may be employed in the angle between cross pieces (Figure 7) or in similar locations in more complicated erections (Figure 13), but this narrow form, either smooth or embossed, may be used in any location where simple clipping is required, as in Figures 12 and 13. The fastening with embossings shown in Figure 6 may also be used to fix strips to angle bars. To this end, as shown in Figure 9, the angle bars are provided with slits 12 located across their arrises into which slit can be introduced one of the branches of the clip, holding the element to be assembled on the inside of the angle as shown.

Figure 10 shows another method of forming the clip according to the invention. In this case the pieces to be assembled are provided with embossings in relief and depression preferably disposed as shown in Figures 10 to 13, and 15 to 17. Smooth fastenings of the very simple form shown on Figs. 10–13 allow for effecting the most varied and extremely rigid erections. The cross section of these fastenings is of smooth U-form, but endways they may be made of any form suitable for the work, as in Figs. 10, 11, and 14.

It will clearly be seen in Figure 15 how the embossings 2 engaging in the holes 2' secure the two pieces 5 when a fastening is forced astride the latter. It is to be noted that the depressions 2' must have a diameter slightly greater than that of the embossings 2, especially when the pieces are painted so as to facilitate the lodgement of the embossings 2 in the depressions 2'.

The same arrangement of embossings can be applied to the assembly of the parts of wheels or pulleys. Figure 16 shows half of a wheel which when connected back to back with a like half can form a pulley. The two halves are fixed by fastenings such as those shown in Figure 12 or 3, which are placed on the spokes. The embossings 2 are here alternated with holes 2' in place of depressions in order not to form projections on the hollow face (front) of the wheel where they would serve no purpose. At the time of assembly the embossings 2 of one of the halves engage in the holes of the other and prevent relative rotation or diametral slipping.

The fastening for fixing a disc or wheel on an axle has a form almost similar to that which has just been described. Figure 19 shows that, in fact, it has a U form. In this case it is formed by a metal blade having two facing holes 6 in the limbs and provided with small spurs or keys 7, Figure 18. Further, a spur or peg 8 is fixed on one of its branches.

The fastening shown in Figures 18 and 19 is fixed on an axle provided for this purpose with a helical groove or keyway 9. To place the fastening on an axle, the two limbs are squeezed together until the spurs 7 are adjacent, thereby enabling the clip to be slid on. Upon slackening the grip, the two limbs spring apart, thereby causing the spurs to grip the groove. This action further tends to produce a slight torsion in the fastening, as shown in an exaggerated manner in Fig. 20.

Figure 19 shows how the clip is used to fasten a disc or the like 10 on an axle. The aforesaid spur 8 is shown as engaging in one of the holes 11 provided for this purpose in the disc 10. Alternatively, embossings of the kind already described, but formed outwards before the clip is bent, could be used to engage the holes 2' in the spokes of the wheel shown in Fig. 16, and holes formed in the clip to receive the embossings 2 on the wheel, a further and smooth clip being used to hold the parts together as before.

Figure 21 shows an assembly made by means of a fastening similar to that of Figures 18 and 19 but not provided with the peg 8. To this end, an auxiliary piece 14 is employed which is introduced between the branches of the fastening 1'. The fastening is pinched and the two are placed together on the axle as described with reference to Figs. 19 and 20. This locks the cross-piece 14 to the axle, and the wheel is then secured to the piece 14 by fastenings 1 in the usual manner, the embossings and holes or depressions engaging as before.

The assemblies by fastenings which have just been described could be completed in certain cases by bolts. In the latter case, the rigidity of such an assembly would be proof against any forces tending to displace the members angularly.

It is to be understood that only those methods of assembly have been described which are the most characteristic for showing the various possible uses which can be derived from the new constructional toy; it is therefore intended that the invention shall not be limited to the methods of carrying out which have been described and that it could be carried out by other means without in any way departing from its scope.

We claim:—

1. A metal constructional toy comprising in combination, a plurality of flat-surfaced elements to be assembled having geometrically distributed over their contacting surfaces a plurality of corresponding sets of inter-engageable substantially cylindrical embossings and depressions including U-section spring clips for placing astride the surfaces forming a joint with both its limbs in substantially flat contact with the elements and holding a set of embossings in engagement with a set of depressions.

2. A metal constructional toy comprising in combination, a plurality of strip and sheet elements to be assembled having geometrically distributed over their contacting surfaces a plurality of sets of inter-engageable perforations and substantially cylindrical embossings and U-section spring clips for placing astride the junctions of said elements and holding a set of said embossings in engagement with a set of said perforations.

LOUIS ROUSSY.
RENÉ TRUBERT.